US006785553B2

(12) United States Patent
Chang et al.

(10) Patent No.: US 6,785,553 B2
(45) Date of Patent: *Aug. 31, 2004

(54) POSITION LOCATION OF MULTIPLE TRANSPONDING PLATFORMS AND USERS USING TWO-WAY RANGING AS A CALIBRATION REFERENCE FOR GPS

(75) Inventors: Donald C. D. Chang, Thousand Oaks, CA (US); Kar W. Yung, Torrance, CA (US); David C. Cheng, Boston, MA (US); Ming U. Chang, Rancho Palos Verdes, CA (US); Frank A. Hagen, Palos Verdes Estates, CA (US)

(73) Assignee: The Directv Group, Inc., El Segundo, CA (US)

(*) Notice: Subject to any disclaimer, the term of this patent is extended or adjusted under 35 U.S.C. 154(b) by 378 days.

This patent is subject to a terminal disclaimer.

(21) Appl. No.: 09/841,110

(22) Filed: Apr. 24, 2001

(65) Prior Publication Data

US 2003/0208317 A1 Nov. 6, 2003

Related U.S. Application Data

(63) Continuation-in-part of application No. 09/209,062, filed on Dec. 10, 1998, now Pat. No. 6,246,363, and a continuation-in-part of application No. 09/584,012, filed on May 30, 2000, which is a continuation-in-part of application No. 09/271,997, filed on Mar. 18, 1999.

(51) Int. Cl.[7] .............................................. H04Q 7/20
(52) U.S. Cl. .............................. 455/456.5; 455/456.6; 342/357.1; 342/357.14; 342/358
(58) Field of Search ........................... 455/456.1, 456.2, 455/456.3, 456.4, 456.5, 456.6, 457, 426.1, 427, 454, 66.1, 344; 342/357.01–357.09, 357.1, 357.12, 357.14

(56) References Cited

U.S. PATENT DOCUMENTS

| 2,470,787 A | 5/1949 | Nosker |
| 2,763,857 A | 9/1956 | Valley |

(List continued on next page.)

FOREIGN PATENT DOCUMENTS

EP 0 335 558 4/1989

(List continued on next page.)

OTHER PUBLICATIONS

Teles J et al.: "Overview of TDRSS" Orbit Determination and Analysis. PSD Meeting, Cospar Technical Panel of Satellite Dynamics, 13th Cospar Scientific Assembly, Hamburg, Germany, Jul. 11–21, 1994, Advances in Space Research, pp. 67–76.

(List continued on next page.)

Primary Examiner—Charles Craver
(74) Attorney, Agent, or Firm—Georgann S. Grunebach; John A. Crook, III

(57) ABSTRACT

A method and system for using two-way ranging navigation to accurately determine the location of a transponder platform above-Earth or a fixed or mobile target on the ground or on water. The two-way ranging navigation measurements are used as calibration references, thereby improving the positioning accuracy of GPS. The system includes GPS and a two-way ranging navigation system for taking position measurements of a target. A correction factor is determined as a function of the measurements and the GPS position is adjusted by the correction factor. The method for calibrating GPS using two-way ranging navigation involves taking a two-way ranging navigation measurement and a GPS measurement of a target, determining a correction factor as a function of the measurements, and correcting the GPS position by taking a second GPS measurement and adjusting it by the correction factor.

14 Claims, 9 Drawing Sheets

U.S. PATENT DOCUMENTS

| | | |
|---|---|---|
| 2,821,704 A | 1/1958 | O'Day |
| 3,254,341 A | 5/1966 | Broussaud |
| 3,384,891 A | 5/1968 | Anderson .................... 342/357 |
| 3,544,995 A | 12/1970 | Bottenberg et al. ........... 342/46 |
| 3,665,464 A | 5/1972 | Meilander |
| 3,668,403 A | 6/1972 | Meilander |
| 3,742,498 A | 6/1973 | Dunn |
| 4,161,730 A | 7/1979 | Anderson .................... 343/6.5 |
| 4,161,734 A | 7/1979 | Anderson |
| 4,359,733 A | 11/1982 | O'Neill ...................... 343/6.5 |
| 4,613,864 A | 9/1986 | Hofgen ....................... 343/357 |
| 4,758,959 A | 7/1988 | Thoone et al. |
| 4,819,227 A | 4/1989 | Rosen |
| 4,823,341 A | 4/1989 | Rosen |
| 4,897,661 A | 1/1990 | Hiraiwa ....................... 342/457 |
| 4,994,809 A | 2/1991 | Yung et al. .................. 342/108 |
| 5,006,855 A | 4/1991 | Braff .......................... 342/357 |
| 5,077,759 A | 12/1991 | Nakahara |
| 5,097,269 A | 3/1992 | Takayama et al. |
| 5,099,245 A | 3/1992 | Sagey ......................... 342/357 |
| 5,111,209 A | 5/1992 | Toriyama |
| 5,126,748 A | 6/1992 | Ames et al. ................. 342/353 |
| 5,181,041 A | 1/1993 | Lind et al. |
| 5,187,485 A | 2/1993 | Tsui et al. |
| 5,233,626 A | 8/1993 | Ames |
| 5,278,863 A | 1/1994 | Briskman |
| 5,319,673 A | 6/1994 | Briskman |
| 5,365,447 A | 11/1994 | Dennis |
| 5,379,320 A | 1/1995 | Fernandes et al. |
| 5,387,916 A | 2/1995 | Cohn .......................... 342/44 |
| 5,410,314 A | 4/1995 | Frush et al. .................. 342/26 |
| 5,423,059 A | 6/1995 | LoGalbo et al. |
| 5,444,450 A | 8/1995 | Olds et al. ................... 342/357 |
| 5,467,282 A | 11/1995 | Dennis |
| 5,485,485 A | 1/1996 | Briskman et al. |
| 5,510,797 A | 4/1996 | Abraham et al. |
| 5,525,995 A | 6/1996 | Benner ........................ 342/90 |
| 5,550,809 A | 8/1996 | Bottomley et al. |
| 5,555,257 A | 9/1996 | Dent |
| 5,589,834 A | 12/1996 | Weinberg |
| 5,592,471 A | 1/1997 | Briskman |
| 5,613,219 A | 3/1997 | Vogel et al. |
| 5,617,410 A | 4/1997 | Matsumoto |
| 5,644,572 A | 7/1997 | Olds et al. |
| 5,739,785 A | 4/1998 | Allison et al. .............. 342/357 |
| 5,764,188 A | 6/1998 | Ghosh et al. |
| 5,790,071 A | 8/1998 | Silverstein et al. |
| 5,810,284 A | 9/1998 | Hibbs et al. |
| 5,839,053 A | 11/1998 | Bosch et al. |
| 5,864,579 A | 1/1999 | Briskman |
| 5,867,109 A | 2/1999 | Wiedeman |
| 5,903,549 A | 5/1999 | Von der Embse et al. |
| 5,918,157 A | 6/1999 | Wiedeman et al. |
| 5,920,284 A | 7/1999 | Victor .................... 342/357.01 |
| 5,926,133 A | 7/1999 | Green, Jr. ................... 342/363 |
| 5,940,774 A | 8/1999 | Schmidt et al. |
| 5,944,770 A | 8/1999 | Enge et al. |
| 5,945,948 A | 8/1999 | Buford et al. .............. 342/457 |
| 5,949,766 A | 9/1999 | Ibanez-Meier et al. |
| 5,956,619 A | 9/1999 | Gallagher et al. |
| 5,969,674 A | 10/1999 | Von der Embse et al. .. 342/357 |
| 5,974,039 A | 10/1999 | Schilling |
| 5,983,113 A | 11/1999 | Asanuma |
| 6,020,845 A | 2/2000 | Weinberg et al. |
| 6,040,798 A | 3/2000 | Kinal et al. |
| 6,067,442 A | 5/2000 | Wiedeman et al. |
| 6,070,083 A | 5/2000 | Watters et al. ............. 455/517 |
| 6,084,510 A | 7/2000 | Lemelson et al. |
| 6,138,012 A | 10/2000 | Krutz et al. |
| 6,138,020 A | 10/2000 | Galyas et al. |
| 6,144,336 A | 11/2000 | Preston et al. ......... 342/357.09 |
| 6,151,308 A | 11/2000 | Ibanez-Meier et al. |
| 6,175,737 B1 | 1/2001 | Kao |
| 6,195,555 B1 | 2/2001 | Dent |
| 6,229,477 B1 | 5/2001 | Chang et al. |
| 6,230,018 B1 | 5/2001 | Watters et al. ............... 455/456 |
| 6,243,587 B1 | 6/2001 | Dent et al. |
| 6,246,363 B1 | 6/2001 | Yung et al. ............. 342/357.14 |
| 6,266,533 B1 | 7/2001 | Zadeh et al. |
| 6,289,211 B1 | 9/2001 | Koorapaty et al. |
| 6,295,440 B2 | 9/2001 | Chang et al. |
| 6,298,238 B1 | 10/2001 | Dai |
| 6,313,790 B2 | 11/2001 | Chang et al. |
| 6,314,269 B1 | 11/2001 | Hart et al. |
| 6,337,980 B1 | 1/2002 | Chang et al. |
| 6,340,947 B1 | 1/2002 | Chang et al. |
| 6,377,208 B2 | 4/2002 | Chang et al. |
| 6,388,615 B1 | 5/2002 | Chang et al. |
| 6,445,927 B1 | 9/2002 | King et al. .................. 455/456 |
| 6,452,541 B1 | 9/2002 | Zhao et al. |
| 6,480,788 B2 | 11/2002 | Kilfeather et al. |
| 6,507,739 B1 | 1/2003 | Gross et al. |
| 6,513,758 B1 | 2/2003 | Lloyd |
| 6,563,457 B2 | 5/2003 | Chang et al. |
| 6,633,559 B1 | 10/2003 | Raith et al. |
| 2001/0000167 A1 | 4/2001 | Chang et al. |
| 2001/0045903 A1 | 11/2001 | Chang et al. |
| 2002/0053987 A1 | 5/2002 | Chang et al. |
| 2002/0107034 A1 | 8/2002 | Chang et al. |
| 2002/0118654 A1 | 8/2002 | Chang et al. |
| 2002/0126042 A1 | 9/2002 | Chang et al. |

FOREIGN PATENT DOCUMENTS

| | | |
|---|---|---|
| EP | 0682 416 A2 | 11/1995 |
| EP | 0 749 252 A | 12/1996 |
| EP | 0 837 568 A2 | 4/1998 |
| EP | 0 845 874 A2 | 6/1998 |
| EP | 0 860 708 A | 8/1998 |
| EP | 0 860 709 | 8/1998 |
| EP | 0 860 710 A2 | 8/1998 |
| EP | 0 860 952 A | 8/1998 |
| EP | 0 996 001 | 4/2000 |
| EP | 1 010 988 A | 6/2000 |
| EP | 1 037 403 A2 | 9/2000 |
| EP | 1 139 583 A2 | 10/2001 |
| EP | 1 148 662 A2 | 10/2001 |
| EP | 1 158 698 A2 | 11/2001 |
| FR | 2 621 132 A | 3/1989 |
| GB | 2 271 902 A | 10/1993 |
| GB | 2 306 827 A | 5/1997 |
| JP | 2-28580 | 1/1990 |
| JP | 3-108609 | 5/1991 |
| JP | 3-291584 | 12/1991 |
| JP | 4-27887 | 1/1992 |
| JP | 07146995 A | 6/1995 |
| JP | 08015405 A | 1/1996 |
| JP | 09026328 | 1/1997 |
| JP | 09113600 A | 5/1997 |
| JP | 10090391 A | 4/1998 |
| JP | 10-209939 | 8/1998 |
| JP | 11-8579 | 1/1999 |
| WO | WO 90 13186 A | 11/1990 |
| WO | WO 98 02762 A | 1/1998 |
| WO | WO 9851568 A | 11/1998 |
| WO | WO 01/91310 A2 | 11/2001 |
| WO | WO 01/93458 A2 | 12/2001 |
| WO | WO 01/94969 A1 | 12/2001 |
| WO | WO 01/95520 A2 | 12/2001 |
| WO | WO 01/95522 A1 | 12/2001 |

OTHER PUBLICATIONS

Bricker, P et al.: "Integrated Receiver for NASA Tracking and Data Relay Satellite System", MILCOM 90. A new Era, 1990 IEEE Military Communications Conference, Monterey, CA, USA, Sept. 30 –Oct. 3, 1990, pp. 1–5.

Dunham, J B, et al.: "Onboard Orbit Estimation with Tracking and Data Relay Satellite System Data", Journal of Guidance, Control, and Dynamics, Jul.–Aug. 1983, USA, vol. 6 NR.4, pp. 292–301.

K. H. Bethke, "A Novel Noncooperative Near–Range Radar Network or Traffic Guidance and Control on Airport Surfaces", IEEE Transactions on Control Systems Technology, vol. 1, No. 3, Sept. 1993.

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

Yokosuka Research Park, "The First Stratospheric Platform Systems Workshop", May 12–13, 1999, pp. 1–216.

Colella, Nicholas J. et al., "The HALO Network™", IEEE Communications Magazine, Jun. 2000, pp. 142–148.

Colella, Nicholas J. et al., "High Speed Internet Access via Stratospheric HALO Aircraft", INET 99 Proceedings, Internet Society, Technology, Wireless, 13 pages, Jun. 8, 1999.

U.S. patent application Ser. No. 09/584,012, Chang et al., filed May 30, 2000.

U.S. patent application Ser. No. 09/587,759, Yung et al., filed Jun. 6, 2000.

Colella, Nicholas, "HALO Network—The Birth of Stratospheric Communications Services & the Decline of Satellite Networks", http://www./angelhalo.com/techpaper6, Copyright 1997–1999.

Djuknic, Goran et al., "Establishing Wireless Communications Services via High–Aeronautical platforms: A Concept Whose Time Has Come?" IEEE Communications Magazine, Sep. 1997, pp. 128–135.

Martin, James N. et al., "Halo Network—The Cone of Commerce", http://www.angelhalo.com/techpaper2, copyright 1997–1998.

Martin, James N. et al., "Halo Network—Broadband Wirelss Services from High Altitude Long Operation (HALO) Aircraft", http://www.angelhalo.com/techpaper2, copyright 1997–1998.

Akyildiz, Ian F. et al., "HALO (High Altitude Long Operation): A Broadband Wireless Metropolitan Area Network", IEEE International Workshop on Mobile Multimedia Communications, Nov. 1999, pp/. 271–275.

Mobara et al., "Introduction to Space Engineering II", First Edition, Kabushiki Kaish Baifukan, Sep. 30, 1998, pp. 173–183 with partial translation in English.

POSITION LOCATION OF MULTIPLE TRANSPONDING PLATFORMS AND USERS USING TWO-WAY RANGING AS A CALIBRATION REFERENCE FOR GPS

CROSS-REFERENCE TO RELATED APPLICATIONS

This application is a continuation-in-part application of Ser. No. 09/209,062 entitled "Method and System For Incorporating Two-Way Ranging Navigation As a Calibration Reference for GPS", filed Dec. 10, 1998 U.S. Pat. No. 6,246,363 and a continuation-in-part application of Ser. No. 09/584,012 entitled "Multi-Node Wireless Communication System With Multiple Transponding Platforms", filed May 30, 2000 (which was a continuation-in-part application of Ser. No. 09/271,997, entitled "Multiple Satellite Mobile Communications Method and Apparatus for Hand-Held Terminals" filed Mar. 18, 1999). The disclosures of Ser. Nos. 09/209,062, 09/271,997 and 09/584,012 are incorporated herein by this reference.

This application is related to application Ser. No. 08/803,936 entitled "A Method and System for Determining a Position of a Target Vehicle Utilizing Two-Way Ranging", filed Feb. 21, 1997, issued as U.S. Pat. No. 5,969,674 on Oct. 19, 1999; Ser. No. 08/803,937 entitled "A Method and System for Determining a Position of a Transceiver Unit Utilizing Two-Way Ranging in a Polystatic Satellite Configuration" filed Feb. 21, 1997; and Ser. No. 09/174,182 entitled "A Method and System for Determining a Position of a Communication Satellite Utilizing Two-Way Ranging", filed Oct. 16, 1998. The disclosures of each of pending application Ser. Nos. 08/803,936 and 08/803,937 and 09/174,182 are hereby incorporated by reference herein.

TECHNICAL FIELD

This invention relates to methods and systems for determining the position of a transponding platform that is part of a multi-transponding platform communication system and of users, using two-way ranging navigation. This invention also relates to a method and a system for calibrating the Global Positioning System using a two-way ranging navigation system.

BACKGROUND ART

Current Automatic Dependent Surveillance (ADS) technology in the form of a Global Positioning System (GPS) provides information utilizing satellite communication. The GPS, developed by the United States Department of Defense, consists of twenty-four (24) satellites that orbit the earth twice a day at an altitude of 12,000 miles. Additionally, the GPS consists of five (5) ground stations that monitor and manage the satellites. Using atomic clocks and location data, GPS satellites transmit continuous time and position information twenty-four (24) hours a day to a GPS receiver, which inputs data from three or more satellites simultaneously to determine the user's position on the earth. By measuring the time interval between the transmission and the reception of a satellite signal, the GPS receiver calculates the distance between the user and each satellite. The GPS receiver then uses the distance measurements from at least three satellites to arrive at a final user position or location.

The civilian GPS measurement yields an accuracy of approximately 100 meters. Additional accuracy, at a level needed for targets such as aircraft, is obtained by using a Differential GPS consisting of ground reference points. However, ground reference stations are expensive to deploy, and their effectiveness is limited to a finite radius from the reference position on the surface of the earth.

The civilian GPS system utilizes one-way ranging in which an accurate, synchronized clock is required at each station. Any synchronization error, or any error regarding the location of one of the satellites, results in an error in the determined position of the target. An aircraft, or other target, must have accurate position and velocity information and requires dedicated, precise equipment throughout the flight or mission to provide accurate position and velocity information with a high degree of integrity and reliability.

To overcome this problem, two-way ranging navigation has been proposed by co-pending U.S. application Ser. No. 08/803,936, which is incorporated herein by reference. The two-way ranging navigation system disclosed therein determines a position of a vehicle, such as an aircraft or surface vehicle, utilizing two-way ranging techniques through multiple satellites to derive independent estimates of a vehicle's state vectors including position and velocity.

The two-way ranging navigation system includes transmitting a first signal to a vehicle from a traffic control station through a plurality of satellites. From that signal, the vehicle acquires and tracks a unique ranging code, and a message signal containing the unique code is transmitted from the vehicle. The links through multiple satellites are sequentially or simultaneously processed to provide two-way ranging with reasonably accurate estimations of state vectors. The two-way ranging navigation system processes ranging measurements to derive estimations of vehicle state vectors in response to a first signal and a message signal at a traffic controller, preferably a ground-based traffic controller employing $\alpha$-$\beta$/EKF (Extended Kalman Factor) tracking.

Two-way ranging navigation can be used as a stand-alone positioning system for a target with higher accuracy than GPS systems. During normal communication links, positioning with two-way ranging navigation consumes little space-segment resources. However, when there is no communication between the user and the satellite, also known as "silent intervals", two-way ranging navigation positioning requires additional space-segment bandwidth resources. GPS, on the other hand, being a one-way broadcast positioning system, requires no additional space-segment resources once it is deployed.

Therefore, there is a need to obtain the highest degree of positioning accuracy without the cost of two-way ranging navigation positioning and while utilizing the free civilian GPS signals whenever possible. There is a need for precisely and quickly locating the position of a transponding platform above-ground or mobile user or vehicle on the ground or on water in a multiple transponding platform communication system.

SUMMARY OF THE INVENTION

The communication system of the present invention includes a plurality of individual communication transponding platforms. The plurality of individual transponders are each in communication with a central processing hub such that a signal processed by the central processing hub in the forward link is radiated with compensating time delays to the plurality of individual transponders. The radiated signals are then re-radiated by the plurality of individual transponders and coherently received and processed by a mobile user terminal. The return link signal path is the reverse of the forward link.

The present invention preferably uses a "Geo-stationary" stratospheric platform ("transponding platform") that is suitable for microwave and other payloads similar to those used in satellite communications systems. Since the distance between the ground station and the platform is around twenty km, the delay between transmission and reception is reduced to less than 0.06% of that of a geosynchronous satellite transmission system.

The present invention provides a method and system for using two-way ranging navigation to accurately determine the range along the path from a source to a destination by measuring the time delay during round-trip communication via at least three transponding platforms for an above-ground target such as a stratospheric platform whose position needs to be determined, and via at least two transponding platforms for an on-ground target such as a mobile user whose position needs to be determined. The two-way ranging navigation measurements are used as calibration references, thereby improving the positioning accuracy of GPS without the cost of implementing Differential GPS and without the physical limitations associated with Differential GPS.

The system for calibrating GPS using two-way ranging navigation includes GPS and a two-way ranging navigation system for determining position measurements of a target. A correction factor is determined as a function of measurements taken by the two-way ranging navigation system and the GPS, and the GPS position of the transponding platform or other above-Earth target is adjusted by the correction factor. The user can use two-way ranging navigation periodically to update the correction factors. The more frequent the update, the less error there will be in the correction factor.

The method for calibrating GPS using two-way ranging navigation includes taking a two-way ranging navigation measurement, at a first predetermined time, of an above-Earth target, such as a transponding platform, or a target on the ground or water, such as a moving or stationary vehicle or user or fixture, all herein referred to collectively as "target". A first GPS measurement of the target is also taken at the first predetermined time. A correction factor is determined as a function of the two-way ranging measurement and the GPS measurement. The GPS position is corrected by taking a second GPS measurement of the target at a second predetermined time and adjusting the measurement by the correction factor to obtain a corrected GPS position.

This method is especially advantageous for transponding platforms in wireless communication systems. Higher accuracy can be obtained, when desired, by performing more two-way ranging navigation measurements whenever, and wherever, needed.

It is an object of the present invention to precisely locate the position of a transponding platform that is part of a multiple transponding platform communication system.

It is also an object of the present invention to precisely locate a mobile user or vehicle on the ground or on water using two-way ranging navigation.

It is an additional object of the present invention to precisely locate a fixed target on the ground using two-way ranging navigation.

It is also an object of the present invention to improve the accuracy of GPS without adding unwanted cost and complexity. It is another object of the present invention to utilize two-way ranging navigation as a calibration reference for GPS. It is yet another object of the present invention to broadcast calibration information to all users within a predetermined region.

It is a further object of the present invention to maintain flexibility in the calibration method so as to allow different levels of accuracy based on different applications for navigation. It is still a further object of the present invention to provide a back up navigation system for GPS in the case of GPS failure.

The above objects and other objects, features and advantages of the present invention are readily apparent from the following detailed description of the preferred embodiment when taken in conjunction with the accompanying drawings and appended claims.

BEST MODES FOR CARRYING OUT THE INVENTION

Figure 1:
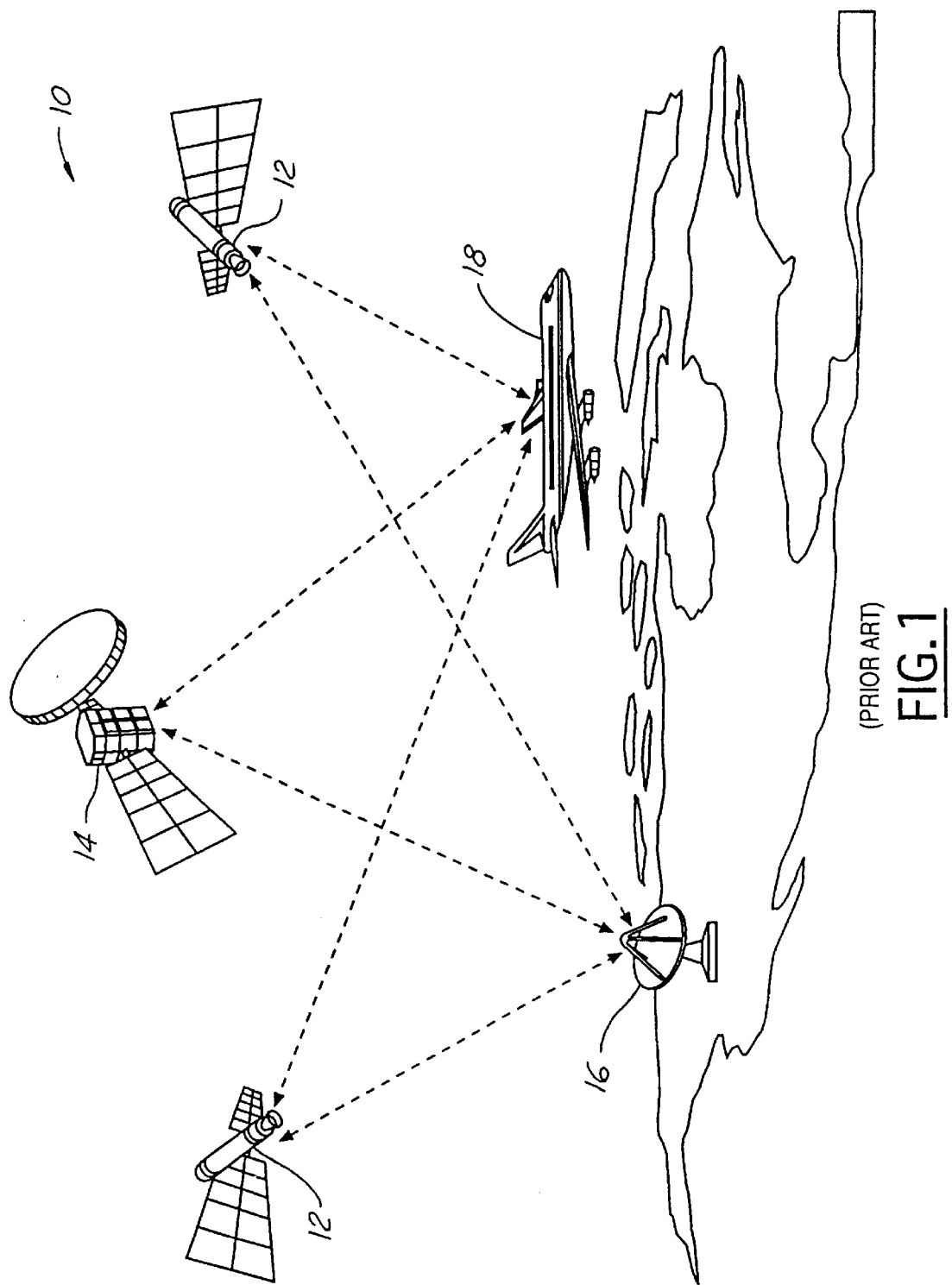
FIG. 1 is a diagrammatic representation illustrating a known communication system employing two-way ranging navigation as a constellation of two Medium Earth Orbit (MEO) satellites and one Geosynchronous Earth Orbit (GEO) satellite.

Referring to FIG. 1 an implementation of a known two-way ranging navigation system for position location and tracking of objects, such as people, vehicles, and aircraft from one or more ground stations via two-way satellite communication links used in the system and method of the present invention is shown. An overview of two-way ranging navigation will be discussed below. For a detailed discussion of the operation of two-way ranging navigation, U.S. patent application Ser. No. 08/803,936 is incorporated herein by reference.

Two-way ranging navigation tracks objects through triangulation, trilateration, and Doppler techniques which involve multiple transponding platforms. FIG. 1 illustrates a two-way ranging navigation system 10 using a plurality of transponding platforms. To accurately locate the position of a target on the ground (for example, a moving vehicle), using two-way ranging, at least two transponding platforms are required. To accurately locate the position of an above-Earth target such as a transponding platform, at least three transponding platforms are required. Note that satellites can be used in place of or in combination with the transponding platforms. However, the transponding platforms provide certain unique advantages because they are positioned much closer to the ground than the satellites. These advantages include reduction of susceptibility to and delays caused by and atmospheric and ionospheric conditions. These advantages result in determination of position of the target with greater precision and minimal delay.

In operation, a ground station 16, preferably with traffic control monitoring, processing and signaling, transmits a ranging signal to a target 18, such as a transponding platform, via any one of the transponding platforms 12. The target 18 acquires and tracks a unique ranging code from another transponding platform, which is then retransmitted, along with a data message, to the same platform from which the target 18 received the code, and then down to the ground station 16.

There are multiple links available, for example, through a plurality of different transponding platforms most of the time, but at least two transponding platforms are always within the field of view of the target 18. A set of the transponding platforms within the field of view may be employed simultaneously through two transponding platforms, or sequentially through a single transponding platform without departing from the scope and spirit of the present invention.

The forward and return path of the ranging signals can be routed through different transponding platforms creating a polystatic trilateration scheme such as described in co-pending U.S. patent application Ser. No. 08/803,937 which is also incorporated herein by reference. A polystatic configuration consists of several transceivers at separated locations, which cooperate with each other. The transceivers may be stationary or moving. By utilizing polystatic techniques, in which the forward and return ranging signals propagate through different transponding platforms, the equal range locations of measurement are confined to an ellipsoidal surface. The two foci are located in the satellite positions so that the sum of the distances between the target 18 and the transponding platforms 12 and 14 are a constant. The two-way ranging navigation measurements are used to derive an $\alpha$-$\beta$ Extended Kalman Filter (EKF) to estimate the target's 18 state vectors at the ground station 16. A polystatic configuration provides a more accurate and a more flexible communication system.

Figure 2:
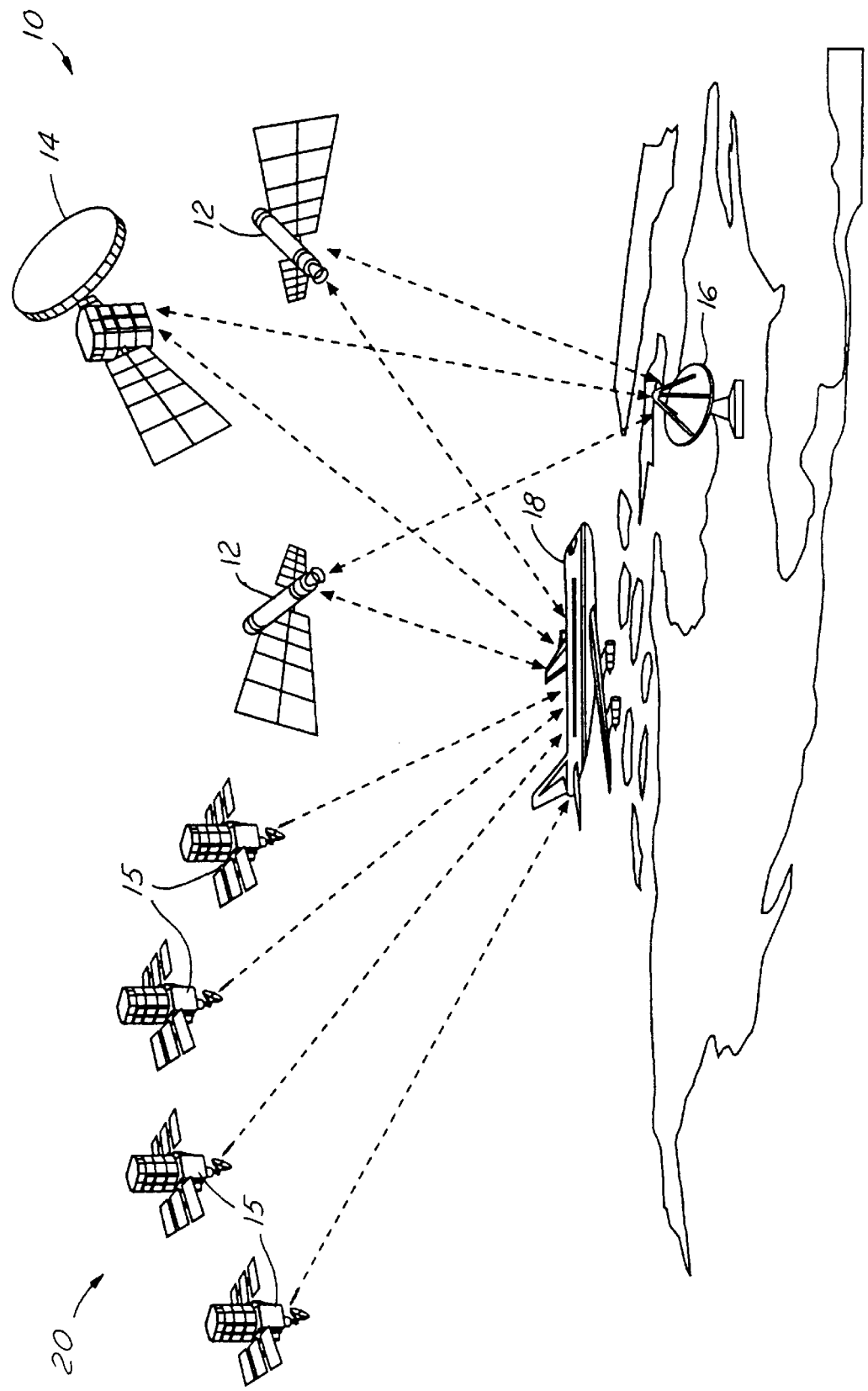
FIG. 2 is a diagrammatic representation illustrating GPS in conjunction with a two-way ranging navigation configuration.
Figure 3:
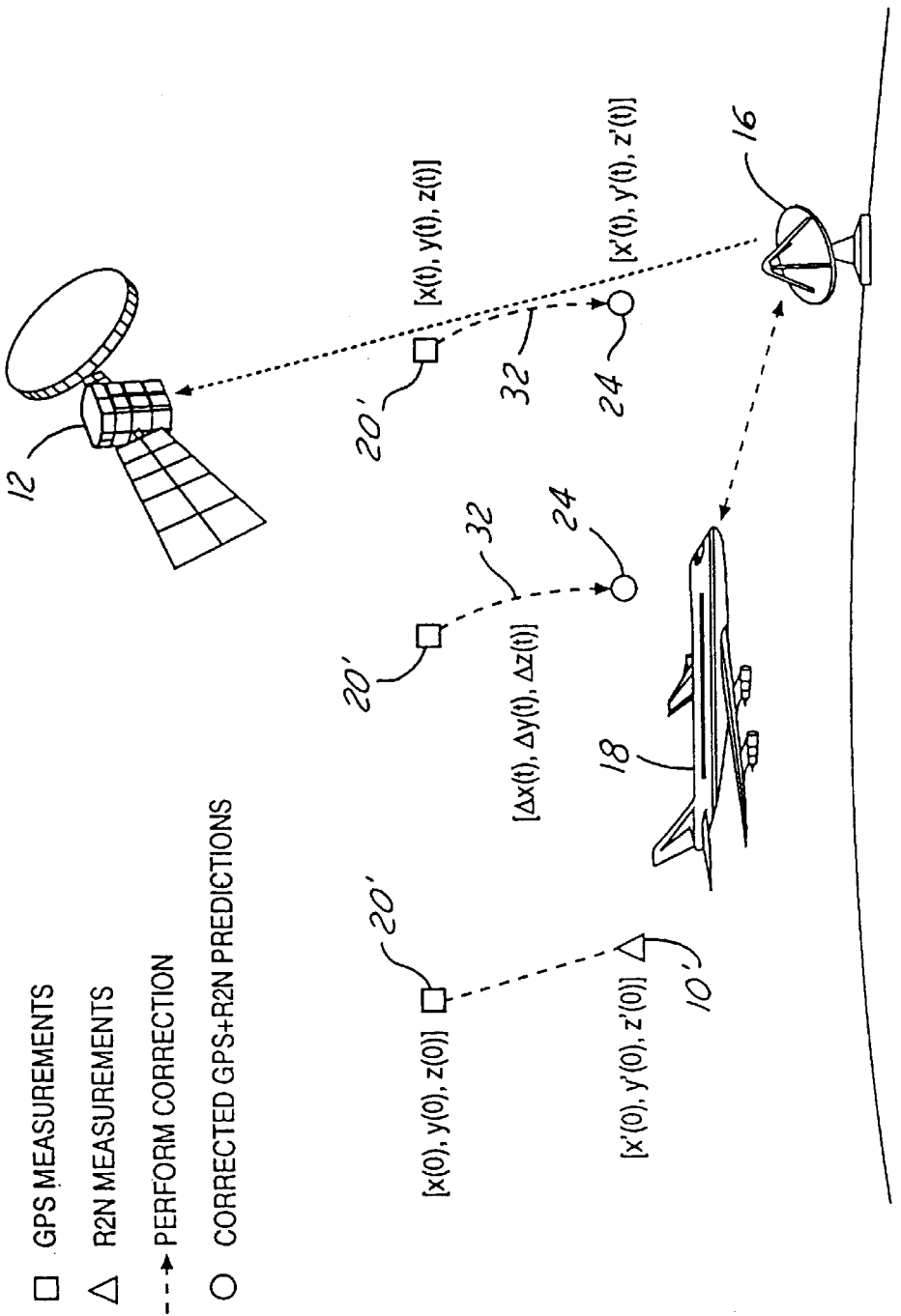
FIG. 3 is a diagrammatic representation of GPS with two-way ranging navigation calibration references.

Referring now to FIGS. 2 and 3, a GPS system 20 in conjunction with the two-way ranging navigation system 10 described above, is shown. In FIG. 2, additional transponding platforms 15 are shown in the system, together with transponding platforms 12 and 14. The present invention utilizes the highly accurate measurements of the two-way ranging navigation system 10 as calibration references to cancel out errors that exist in GPS measurements.

In particular, the method of the present invention requires taking a two-way ranging navigation measurement, R2N 10' from the two-way ranging navigation system 10, and a GPS measurement 20' from the GPS system 20 of the target 18 at a first predetermined period of time, i.e. t=0. Referring to FIG. 3, at time t=0, the measurements are:

$$GPS(t)|_{t=0}\text{:}GPS(0)=\{x(0), y(0), z(0)\} \quad (1)$$

$$R2N(t)|_{t=0}\text{:}R2N(0)=\{x'(0), y'(0), z'(0)\} \quad (2)$$

Figure 4:
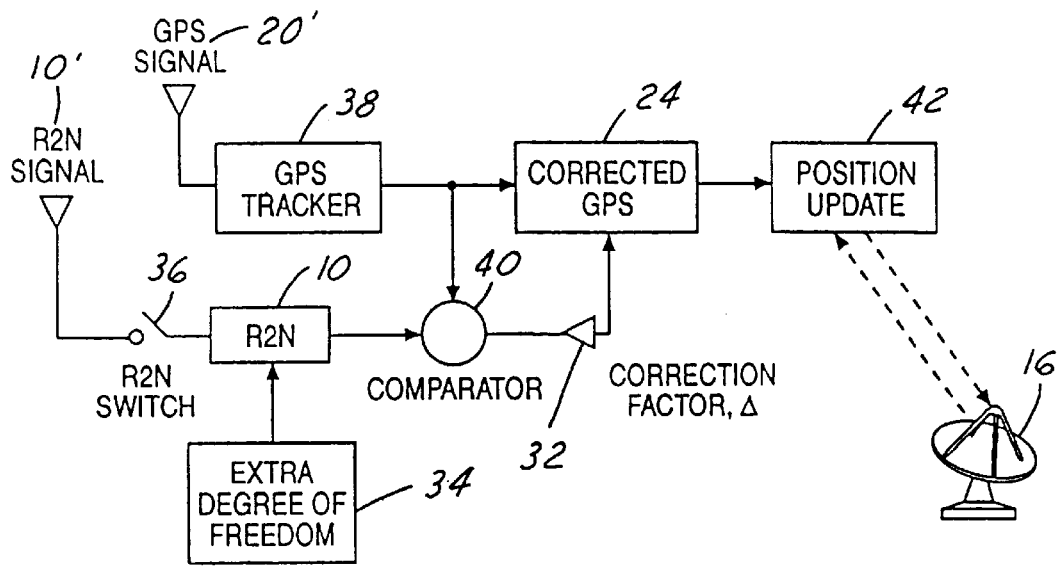
FIG. 4 is a block diagram of an embodiment of the method of calibration of the present invention.

The concept shown diagrammatically in FIG. 3 is shown in block form in FIG. 4. The correction factor 32, $\Delta$, is calculated as a function of GPS(0) and R2N(0):

$$\Delta(t)|_{t=0}\text{:}\Delta(0)=f[R2N(0), GPS(0)]=R2N(0)-GPS(0) \quad (3)$$

The correction factor 32, $\Delta(t)$, at any time, can be extracted from $\Delta(0)$ and other available information such as transponding platform positions, data from an on-board inertial navigation system such as a conventional mechanical gyro system that monitors the distance traveled by the target 18 from a predetermined position, and the results of EKF. The extra degree of freedom 34 allows two-way ranging and navigation to calibrate unknown parameters by manipulating excessive data. The concept of the extra degree of freedom 34 provides capability to solve for additional unknown parameters, thereby making the position estimation more accurate in comparison to equations with less parameters.

R2N switch 36 allows communication only when necessary and required, and prevents communication when not necessary. The communication line can be visualized as a switch that is closed to allow communication and open to prevent communication.

The correction factor 32 is applied to the GPS position at a second predetermined time, t, and the corrected GPS position 24, GPS*, has the form:

$$GPS^*(t)=GPS(t)+\Delta(t)$$

where $$\Delta(t)=f(t, \Delta(0), GPS(t), \dots) \quad (4)$$

As shown in FIG. 4, the GPS signal 20' is received by a GPS tracker 38, and transmitted to a comparator 40. The two-way ranging navigation signal 10' is received by the two-way ranging navigation system 10, and is also sent to comparator 40, where the signals 20' and 10' are used to determine the correction factor 32. The correction factor 32, is then applied to the GPS signal taken at a second predetermined point in time, and results in a corrected GPS signal 24 that is used to update the position 42 of the target 18 at the ground station 16, which in the case of an aircraft target is an Air Traffic Control station.

Figure 5:
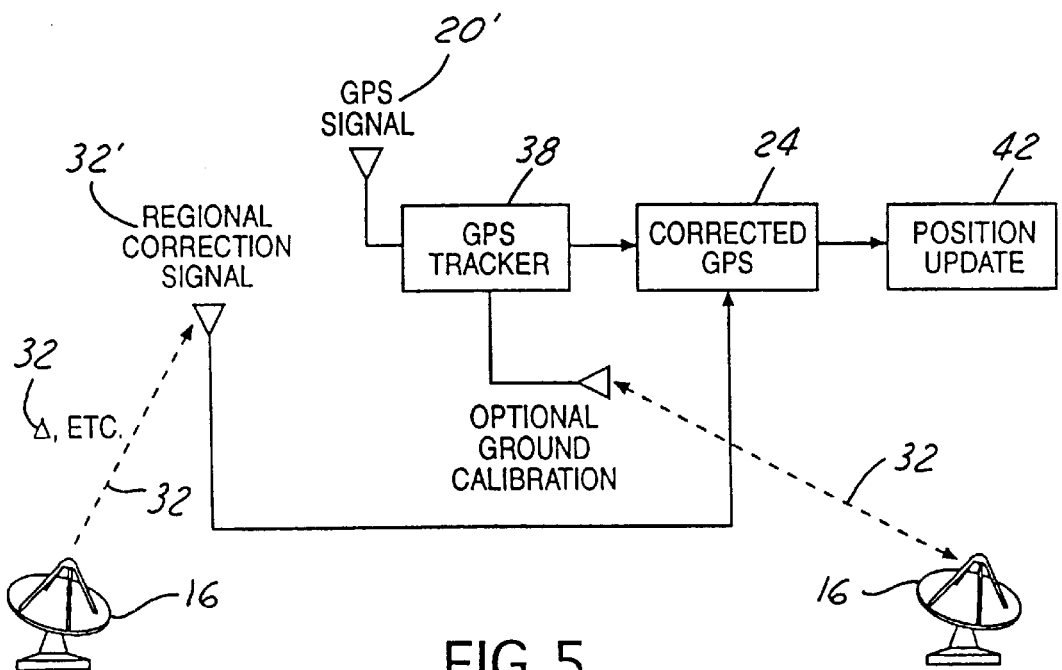
FIG. 5 is a block diagram of an embodiment of the method of calibration of the present invention in which the correction factor is broadcast to users.
Figure 6:
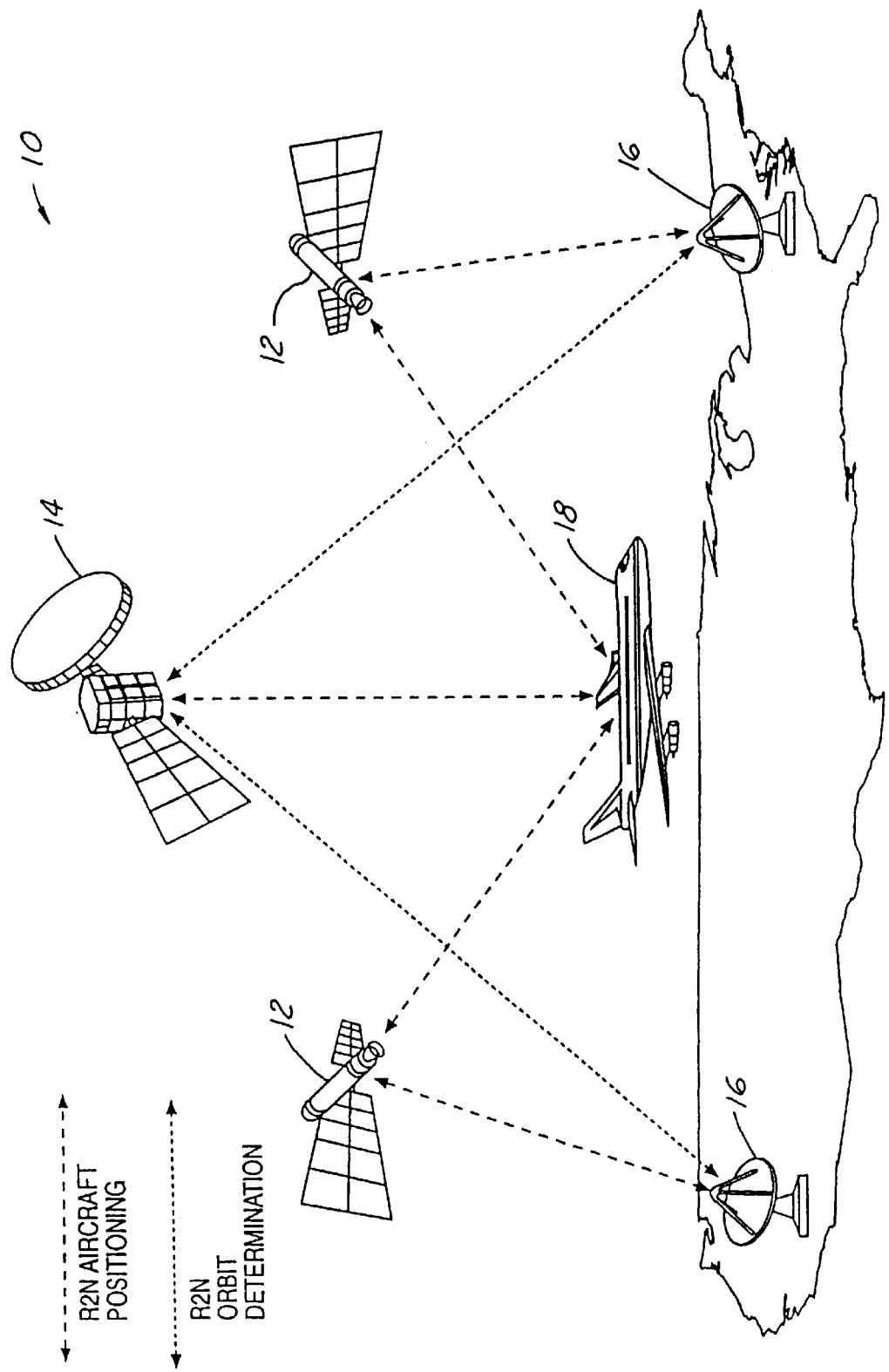
FIG. 6 is a diagrammatic representation of two-way ranging navigation as a backup navigation system to GPS.

FIG. 5 demonstrates the correction factor 32 being broadcast to all users within a region as a regional correction signal 32'. After the correction factor 32 is estimated as shown in FIG. 4 and described above, a user transmits the correction factor 32 to the ground station 16 in any manner, for example, by two-way communication links. The ground station 16 is then able to broadcast the correction factor 32 to all users within a predetermined region, who are capable of utilizing the regional correction factor 32' to obtain a corrected GPS position 24 and ultimately update the position 42 of the target 18.

It is apparent to one skilled in the art that the system and method of the present invention dramatically improves the resolution and accuracy of conventional GPS measurements while at the same time it reduces the need for users to perform frequent two-way ranging navigation calibration.

Only one set of calibrations is needed per region, thereby increasing the accuracy of GPS and at the same time keeping communication costs low as a result of infrequent two-way ranging measurements.

It is also readily apparent that aside from the increase in resolution and accuracy, the present invention has the advantage of flexibility in processing measurements and data. Measurements and other data can be relayed between the user and the ground station 16 via two-way communication links. Data processing can be performed either on-board the target 18, or at the ground station 16.

Additionally, and similarly to Differential GPS, the system and method of the present invention allows the correction factor, 32, $\Delta$, which is preferably calculated at the ground station 16 for most accuracy, but which can also be calculated onboard, to be translated into GPS range corrections, ($\Delta r_1$, $\Delta r_2$, ...) that can then be broadcast to all GPS users within a region. In this embodiment, the correction process becomes:

$$\text{Raw GPS position: } GPS(t)=f(r_1, r_2, \ldots) \tag{5}$$

$$\text{Corrected GPS position: } GPS^*(t)=f(r_1+\Delta r_1, r_2+\Delta r_2, \ldots) \tag{6}$$

Where $r_1$, $r_2$, ... are ranges corresponding to the ranges between the positions in space of transponding platforms 12, 14 and 15 and the ground station 16.

Two-way ranging navigation measurements are highly accurate. Therefore, by correcting the GPS with a well known and accurate reference point in the form of a two-way ranging navigation measurement, errors from selective availability, ionosphere, and atmosphere can be dramatically reduced. However, since atmospheric delay can vary due to weather dynamics, two-way ranging navigation calibration measurements should be performed whenever there is a significant change in weather conditions.

Like Differential GPS, the present invention provides enhanced positioning measurement that utilizes a very accurate reference point to correct error. However, unlike Differential GPS, the present invention does not need to establish a reference point in advance. The present invention is capable of generating a two-way ranging navigation reference point whenever and wherever it is deemed appropriate or necessary. Also, the accuracy of the system and method of the present invention is flexible and can be controlled, allowing a user to select the level of accuracy needed for their particular purpose, eliminating overkill for applications that do not require a high degree of accuracy, resulting in lower operating costs.

When there is a need for higher accuracy, for example in navigation during conditions of zero visibility, the frequency of two-way ranging navigation measurements is increased. This increases the accuracy of GPS through more frequent correction factor calculations and adjustments. This flexibility enables the present invention to be used in a variety of applications including, but not limited to, commercial aviation, ships, shipment containers, surface vehicles, and mobile handsets.

By incorporating GPS with two-way ranging navigation, a back-up navigation method for GPS is established. Therefore, in cases of GPS signal jamming, two-way ranging navigation is able to provide complete navigation without GPS. The two-way ranging platforms 12 and 14 can establish two-way ranging navigation calibration references whenever and wherever a user chooses, provided there was a previous R2N calibration within a certain duration or time, thereby achieving high positioning accuracy without the assistance of GPS. This is described in detail in co-pending U.S. patent application Ser. No. 08/803,936, which has been incorporated herein by reference.

The present invention has application in many multiple-transponding platform constellations or combinations of multiple satellite/platform constellations. The present invention enhances the accuracy of conventional GPS and provides a simple method for more flexible accuracy in tracking a target. Even if the GPS malfunctions, the present invention provides accurate navigation measurements for a variety of tracking applications.

Figure 7:
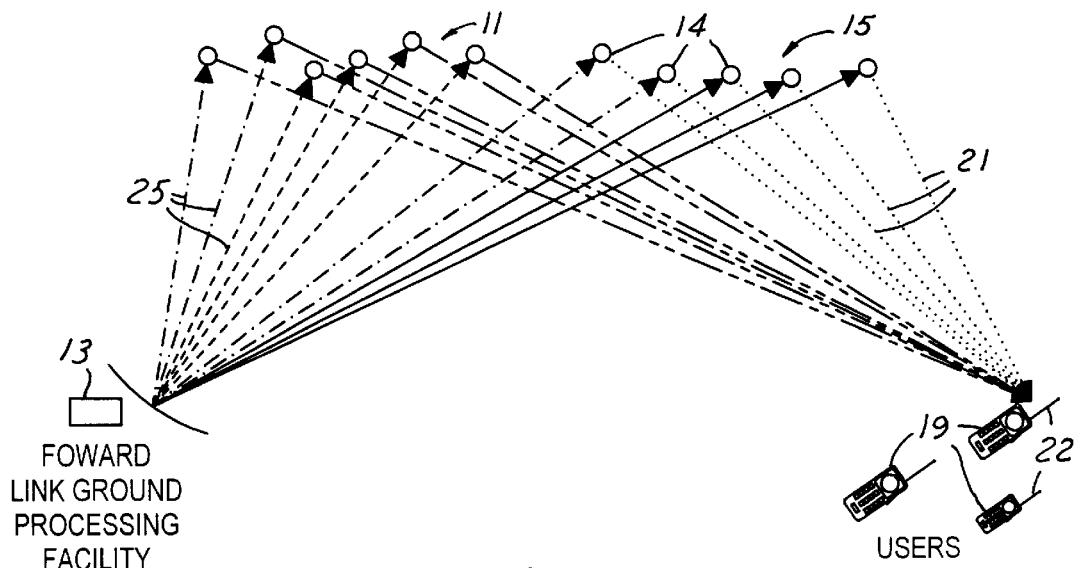
FIG. 7 is a schematic illustration of the forward link geometry of a wireless mobile communications system in accordance with the present invention.

Referring now to FIG. 7, a mobile satellite communication system 11 in accordance with a preferred embodiment of the present invention is illustrated. In FIG. 7, the mobile satellite communications system 11 is illustrated in a forward link mode. The mobile satellite communications system 11 includes a ground telecommunications hub 13, a transponding platform constellation 15 comprised of a plurality of individual transponding platforms 14, and a plurality of hand-held user terminals 19 such as mobile phones. As discussed in more detail below, the user terminals 19 can receive signals 21 simultaneously from multiple transponding platforms 14 via broad beam antennas 22. The ground telecommunications hub 13 is in communication with all of the transponding platforms 14 in the constellation 15 individually and simultaneously. The hub 13 also pre-processes user signals to compensate for path differentials before sending radiated signals 25 to the transponding platforms 14, as discussed in more detail below, and similarly post-processes signals received from the transponding platforms.

In accordance with the preferred embodiment, the design of the individual transponding platforms 14 can be significantly simplified over those utilized in prior mobile systems because the constellation 15 functions as a sparse radiating array. It is known that the more transponding platforms 14 that are included in a constellation 15, the better the performance the communications system 11 will achieve. Transponding platforms that are simple, small, and provide high performance are preferable. This is because the performance of the system 11 depends more heavily on the constellation 15 than on the individual transponding platforms 14.

In a transmit mode, shown in FIG. 7, the individual transponding platforms 14 radiate modulated RF power to a chosen field of view ("FOV"). The system 11 is still operable with reduced capacity and no reconfiguration even if one individual transponding platform 14 is lost for any reason. As a result, the system 11 features graceful degradation characteristics and provides very high reliability and availability. Most of the complexity of the system 10 is located in the ground hubs 13, which locate and track the potential users and perform the major functions of beam-forming and filtering, as discussed below.

Figure 8:
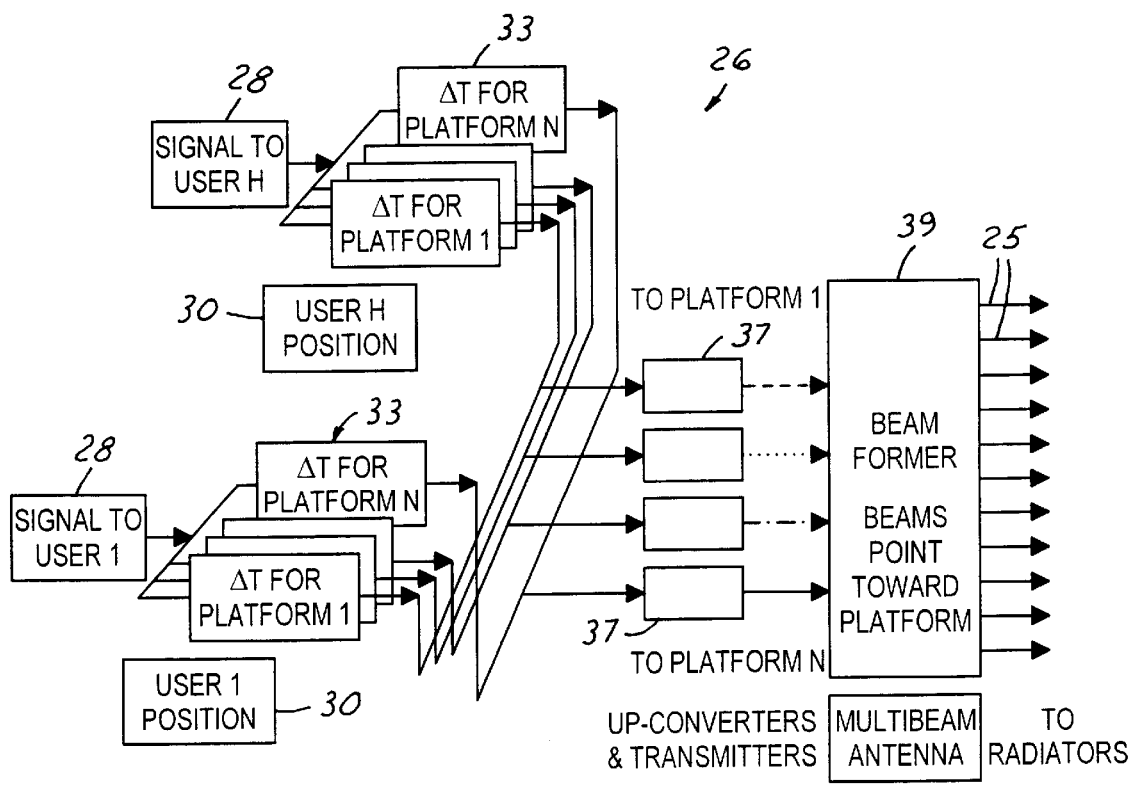
FIG. 8 is a schematic block diagram illustrating the signal transmission function of a ground telecommunications hub for a wireless mobile communications system in accordance with a preferred embodiment of the present invention.

In FIG. 8, the processing performed at the ground telecommunications hub 13 is diagrammatically illustrated. The hub 13 tracks, updates, and forward predicts the time variant differential information among various paths between the hub 13 and the intended user terminals 19. The accuracy of this information is preferably within a tenth of a RF wavelength. For UHF satellite systems, the required path differential accuracy must be about ten (10) centimeters. For L and S band mobile satellite constellations, the accuracy must be on the order of one (1) centimeter. Unfortunately, the conventional or GPS techniques are not able to provide the required accuracy.

In accordance with the present invention, the required accuracy of the equivalent path differentials, including all propagation distortion, can be provided using two-way active calibration and R2N (two-way ranging navigation) techniques.

The ground telecommunications hub 13 has a processing center 26 that processes each signal and is shown in a transmit mode in FIG. 8. The hub 13 has the capability to address the plurality of transponding platforms 14 individually through the use of antenna spatial discrimination to provide separate signals to different transponding platforms. Alternatively, code identification can also be used to address different transponding platforms independently.

As shown in FIG. 8, assuming that there are "H" users, the signals from user 1 to user H, identified generally by reference number 28, are input into the processing center 26. The positions of the various users (1 to H), designated by reference number 30, are determined generally by the circuitry from the various user signals 28. The various user signals 28 for user 1 to user H are then combined for transmission to the different transponding platforms 14, as generally indicated by reference number 33. In this case, the signal is sent to N transponding platforms. The combined signals are then amplified, filtered, up converted, and then further amplified, as generally indicated by reference number 37. These signals are then delivered to a multiple beam antenna 39 where beam-forming processing is done so that the signals can be transmitted to each of the N transponding platforms via radiating signals 25. The beam-forming process can be done in baseband or a low IF frequency band by either digital or analog means. For a low bandwidth (less than a few MHz) signal, digital implementation can provide cost advantages. The processed signal 25, radiated from the ground hub 13 to each transponding platform, is amplified, filtered, and then re-radiated by each of the multiple transponding platforms 14 to arrive at a designated user location simultaneously. Consequently, the radiated signals from the multiple transponding platforms will be received coherently by a simple hand-held terminal 22.

Equivalently, the effect of the spatial processing performed by the processing center 26 is to focus signal strength on the user from multiple transponding platforms 14, which act like sparsely separated portions of a large active reflector. Therefore, the processing on the ground will insert different time delays into the signals 25 which are radiated via various paths (i.e., transponders). The time delays will be inserted into the signals 25 as if the transponding platforms were located on an ellipsoidal surface, of which the two foci are located exactly at the hub 13 and the designated user 19 positions respectively. In low and middle earth orbit constellations, the users 19 and the hub 13 will always be in the near field of the sparse array.

Figure 9:
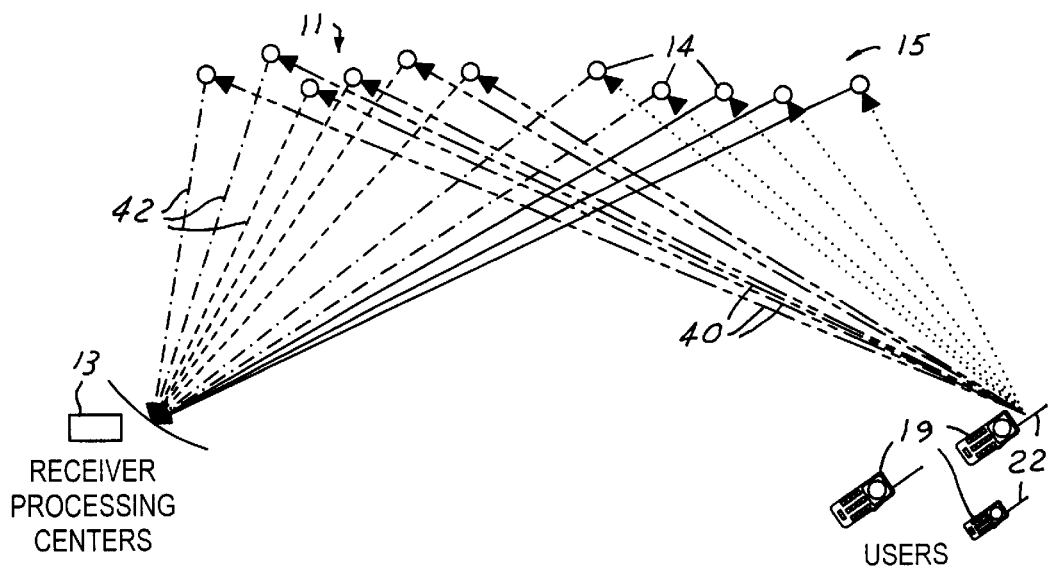
FIG. 9 is a schematic illustration of the return link geometry of a wireless mobile communications system in accordance with a preferred embodiment of the present invention.

In receive mode, shown in FIG. 9, the individual transponding platforms 14 collect RF signals from the same FOV. FIG. 9 illustrates the return link geometry for receiving signals sent from the user terminals 19 to the ground telecommunications hub 13. As shown in FIG. 9, there are two groups of links involved: the links between users 19 and the transponding platforms 14, generally indicated by reference number 40, and those between the transponding platforms 14 and the hub 13, as generally indicated by reference number 42. For best performance, the user antennas 22 preferably are able to illuminate all the transponding platforms 14 involved. This will lead to a constraint on the variation of the gain of the user antenna 22 over the cluster.

As with the forward link geometry, the transponding platforms 14 will amplify the signals 40 received from the users 19 and re-radiate the signals 42 toward the hub 13. The hub 13 can receive signals 42 independently, but simultaneously from the transponding platforms 14, and will add the signals 42 from different transponding platforms coherently in the post-processor 44 as illustrated in FIG. 10.

Figure 10:
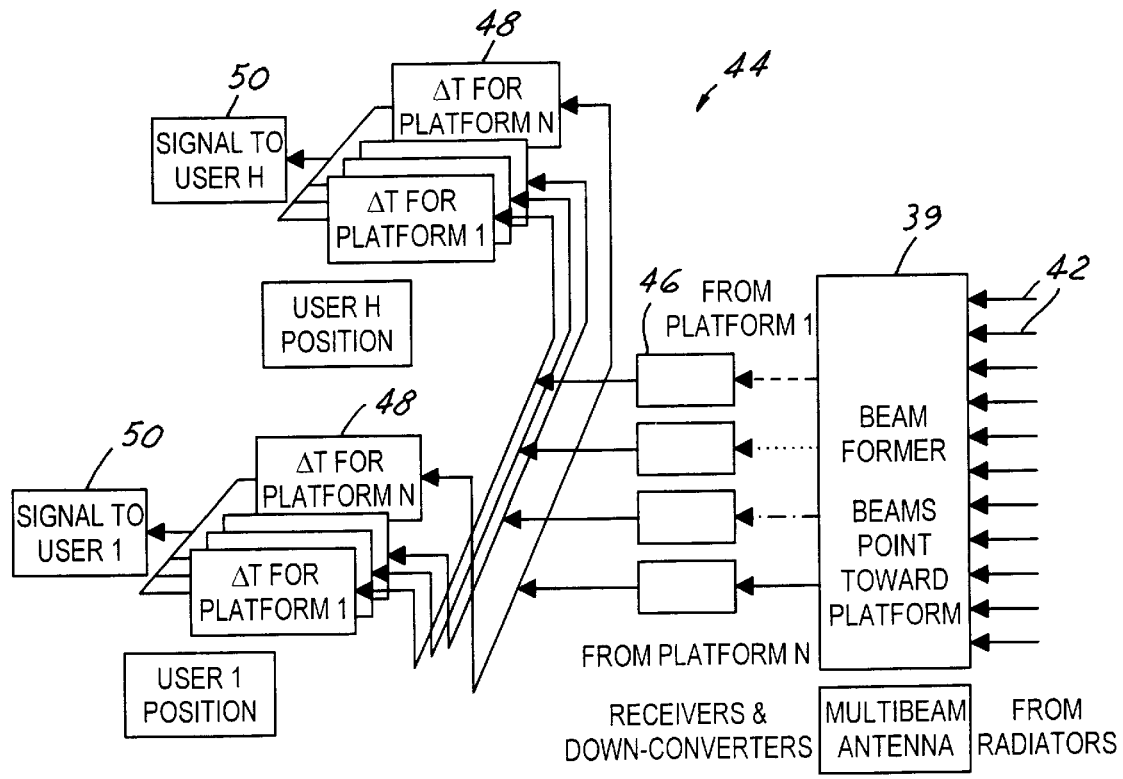
FIG. 10 is a schematic block diagram illustrating the signal receive function of a ground telecommunications hub for a wireless mobile communications system in accordance with a preferred embodiment of the present invention.

The signal flows on the block diagram shown in FIG. 10 illustrate the receive function of the post-processor 40 and the hub 13. The signal flows are reversed from the corresponding ones in FIG. 8. Therefore the receive process will not be reiterated in detail. However, the links 42 from the transponding platforms 14 to the hub 13 are received at the beam-former 39 and then transferred to the receiver and down converters 46 before the signals are separated. The signals are separated depending upon the user from which they are received, as generally indicated by reference number 48, and then sent to the specific user 1 through H, as generally indicated by reference number 50. It should be understood that both the receive and transmit functions are necessary parts of the pathlink calibration and user positioning.

The technique of the present invention has been demonstrated to significantly reduce the average sidelobe levels. It has been determined that this is due to three factors. First, the proposed architecture is not a periodic array, but rather a randomly spaced sparse array, which has no grating lobes. Although the average sidelobe level at a single frequency is relatively high, the level decreases with increasing bandwidth. Second, the large sparsely filled array formed by the transponding platforms is a large extended aperture. Thus, all of the users on the ground are in the near field of the extended aperture and the wavefronts received by all users are spherical instead of planar. Consequently, dispersion effects become much more pronounced than would be the case in the far field. The dispersion grows very fast as a probe is scanned away from the main beam and the dispersion smears the power distribution very effectively over a finite signal bandwidth. Third, the communication system is preferably designed with a large frequency bandwidth. The information signal will therefore be spread over this bandwidth via CDMA or through short duration waveforms for TDMA schemes.

Figure 11:
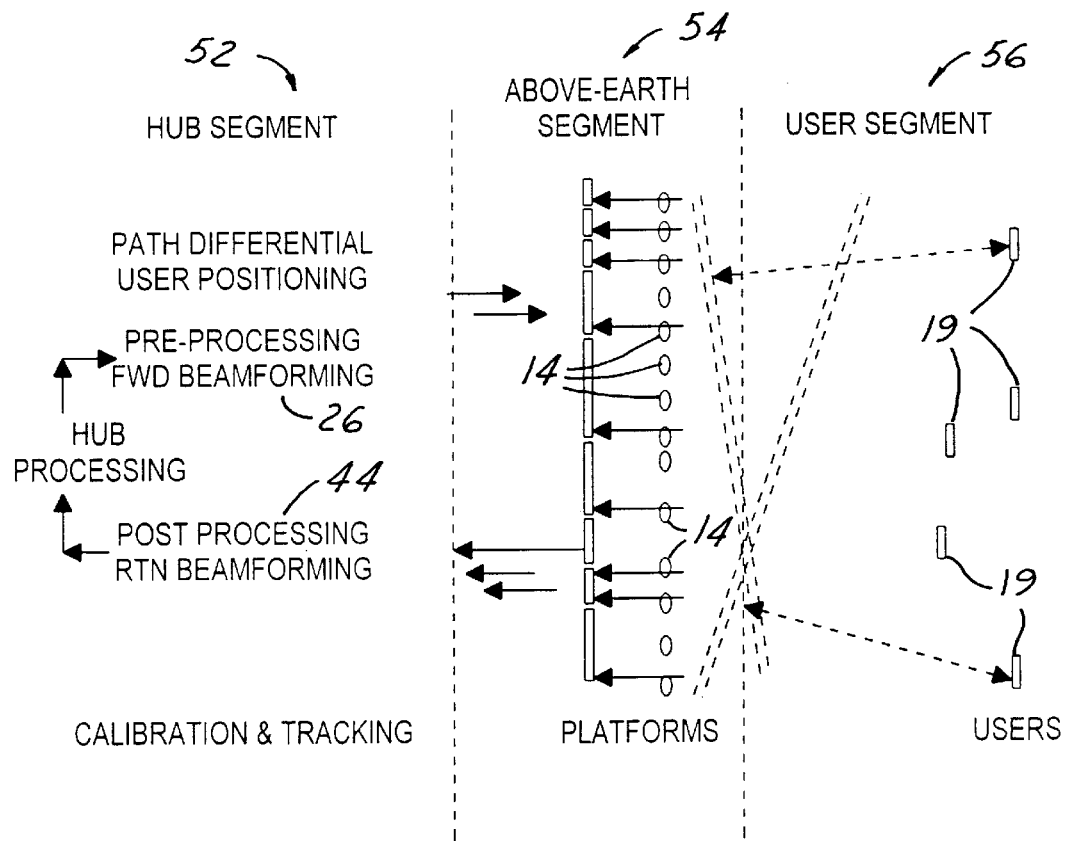
FIG. 11 is a schematic flow diagram illustrating the overall architecture for a wireless mobile communications system in accordance with a preferred embodiment of the present invention.

FIG. 11 illustrates diagrammatically the operation of the invention, which allows for the increased re-use of precious frequency spectrum by multiple transponding platforms. The advantages provided by this system include no limitation on frequency re-use by additional transponding platforms for point-to-point communications. Rather, the capacity of this system is only limited by total transponding platforms' RF power. Further, the preferred embodiment allows for the use of simple and low cost transponding platforms designs, because the greater the number of transponding platforms included in the constellation, the better the performance of the overall system. The system also provides high system reliability through graceful degradation, as well as concentrating complex processing at the hubs.

The preferred embodiment creates demand for a large number of low cost transponding platforms and also uses R2N techniques to perform transponding platform and user positioning. The more users using this system, the more accurately the transponding platforms and user positions can be determined. However, even more important than the actual positions of the users and transponding platforms are the path lengths traversed by the signals. Therefore, periodic calibration techniques applied directly to those path lengths may be much simpler and more cost effective. The system also benefits from the large percentage bandwidths available with CDMA and TDMA systems.

As shown in FIG. 11, the present invention is divided into three segments: a hub segment 52 containing the ground telecommunications hub 13, an above-ground segment 54 containing a plurality of individual transponding platforms 14, and a user segment 56, having a plurality of user terminals 19. The hub segment also has a processing center 26 which pre-processes the transmittal signals and post-processor 44 for post-processing the received signals.

The user terminals 19 receive and transmit signals simultaneously from/to multiple transponding platforms 14 via broad band antennas. The user terminals 19 do not require any capability to separately address the individual transponding platforms 14 in the above-ground segment 54. The hub 13 pre-processes the signals intended for each local user on transmission and post-processes the signals supplied to each local user on reception to compensate for path differentials. These corrections are separately computed and applied to the signals transmitted to or received from each transponding platforms 14 of the above-Earth segment 54. While the invention thus far has been discussed in connection with a plurality of transponding platforms 16, it should be understood that a variety of other transponder nodes including satellites can be utilized instead of or in combination with one or more of the transponding platforms 16.

Figure 12:
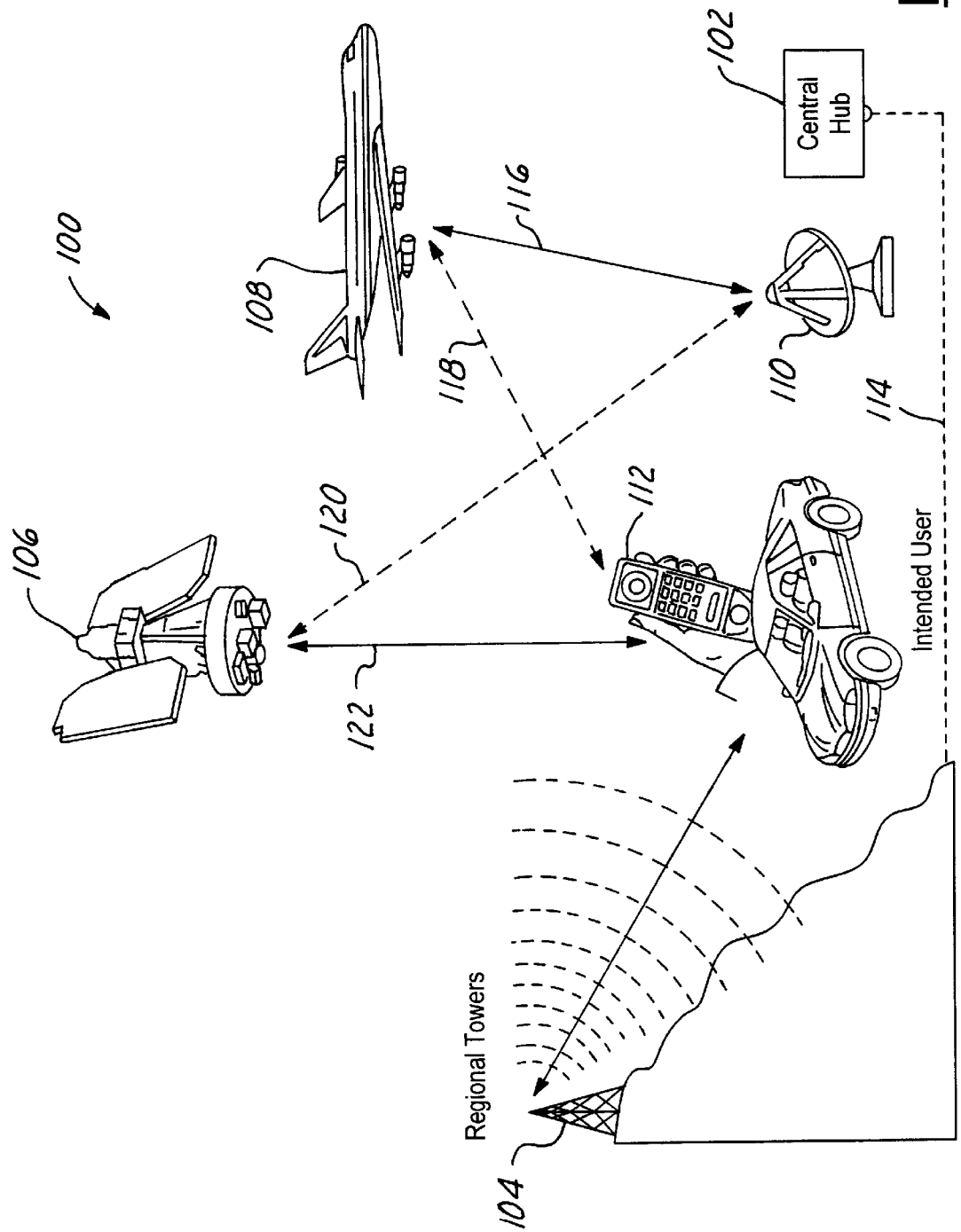
FIG. 12 is a schematic illustration of a wireless communication system for point-to-point communication using a variety of different types of transponder nodes in accordance with a preferred embodiment of the present invention.

Referring now to FIG. 12, an exemplary communication system 100 in accordance with a preferred embodiment is illustrated. The exemplary communication system 100 includes a central hub 102, a transmitter tower 104, a transponding platform 106, a transponding platform 108, an antenna 110, and an intended user 112. The intended user 112 may be either a fixed user or a mobile user.

The central hub 102 is in direct communication with the antenna 110 in order to process the signals transmitted to and received from the antenna 110, in accordance with the techniques described above. In accordance with this exemplary embodiment, the central hub 102 also communicates with the transmitter tower 104 through line 114 in order to perform the processing of signals transmitted to and received from the transmitter tower 104. The line 114 may be a ground wire or may represent a wireless communication between the central hub 102 and the transmitter tower 104. Further, while only a single antenna 110 and a single tower 104 are illustrated, it will be understood that multiple antennas and multiple towers may be employed. Further, the tower 104 may be part of a regional or national tower-based cellular network for either fixed or mobile communications.

As shown, in the example, the central hub 102 processes signals 116 that are transmitted from the antenna 110 to a high altitude platform 108. In the forward link, the signal 116 is then transmitted from the high altitude platform 108 to the intended user 112, as represented generally by the signal 118. In the return link, the intended user sends a signal 118 to the high altitude platform 108 which then sends a signal 116 to the antenna 110, which is then processed by the central hub 102. Further, the central hub 102 also processes signals 120 that are transmitted by the antenna 110 to a transponding platform 106. The transponder 106 then transmits the signal 122 to the intended user 112. In the return link, the intended user 112 sends a signal 122 to the transponder 106, which then sends the signal 120 to the antenna 110 for processing by the central hub 102.

Additionally, the central hub 102 sends a signal 114 to the transmitter tower 104, which in turn communicates with the intended user 112 through a signal 124. In the return link, the intended user 112 communicates with the tower 104 through a signal 124, which then communicates with the central hub 102 through line 114 for processing of the signal. While only a single transponder node (i.e., satellite, high altitude platform or tower) of each type is disclosed, a specific system may utilize any combination of such transponder nodes. It should be understood that any high altitude platform system such as manned/unmanned airships, balloons, or airplanes may be utilized in accordance with the disclosed system. Further, any space-based system that involves one or more spacecraft for point-to-point communications may be utilized in accordance with the disclosed system.

The disclosed exemplary system 100 can greatly improve frequency re-use efficiency for point-to-point communications such as those in multiple telephone and two-way Internet protocol. This improved capability results from the fact that the information for the intended receiver (user) 112 will arrive from all transponders in-phase. By this configuration, information for non-intended users will generally arrive out-of-phase. For non-intended users, the out-of-phase signals will appear as noise. The performance of the proposed invention will depend upon the spatial separations between the various transponder nodes, as well as the remote users. The communication bandwidths between the transponders and the users will also impact the performance. The effect of these on the disclosed system 100 can be determined in a variety of known ways.

Thus, the present system 100 can be comprised of a plurality of transponder nodes that are solely part of a pure tower-based system, a system of high altitude platforms, such as a stratospheric platform, or a communications satellite system. Alternatively, the system can consist of a plurality of transponders that are selected from all of or some of the above types of transponder nodes.

Having now fully described the invention, it will be apparent to one of ordinary skill in the art that many changes and modifications can be made thereto without departing from the spirit or scope of the invention as set forth herein.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A method for locating the position of a transponding platform using a global positioning system and a two-way ranging navigation system, said method comprising the steps of:
   taking a two-way ranging navigation measurement of said the transponding platform at a first predetermined time;
   taking a first global positioning system measurement of said transponding platform at said first predetermined time;
   determining a correction factor as a function of said two-way ranging navigation measurement and said global positioning system measurement; and
   obtaining a corrected global positioning measurement by taking a second global positioning system measurement of said transponding platform at a second predetermined time and adjusting said second global positioning system measurement by said correction factor.

2. The method of claim 1 wherein said step of determining a correction factor further comprises determining said correction factor as function of said two-way ranging navigation measurement and said global positioning system measurement at said first predetermined time and a known transponding platform position.

3. The method of claim 1 wherein said step of determining a correction factor further comprises determining said correction factor as a function of said two-way ranging navigation measurement at said first predetermined time and data from an inertial navigation system located on-board said transponding platform.

4. The method of claim 1 wherein said step of determining a correction factor further comprises determining said correction factor as a function of said two-way ranging navigation measurement, said global positioning system measurement at said first predetermined time and results of Extended Kalman Filtering.

5. The method of claim 1 wherein said step of correcting the global positioning system position further comprises relaying data and measurements by way of two-way communication links.

6. The method of claim 1 wherein said step of determining a correction factor further comprises performing data processing at a ground station.

7. The method of claim 1 wherein said step of determining a correction factor further comprises translating said correction factor into GPS range correction factors.

8. The method of claim 1 further comprising the step of repeating the calibration method steps when weather conditions change.

9. The method of claim 1 further comprising the step of enhancing the accuracy of said calibrating method by increasing the frequency of two-way ranging and navigation measurements.

10. The method of claim 1 further comprising the steps of:
sending said correction factor to a ground station; and
broadcasting said correction factor throughout a predetermined region.

11. The method of claim 1 wherein said two-way ranging navigation system is a back-up navigation method for said global positioning system in instances of failure of said global positioning system.

12. A method for locating the position of a target, comprising the steps of:
a) taking a first global positioning system measurement of the target at a first predetermined period of time;
b) taking a two way ranging navigation measurement of the target at said first predetermined period of time, said two way ranging navigation system comprising:
   i) at least one ground station;
   ii) a plurality of transponding platforms in communication with said ground station through a first link; and
   iii) a target in communication with said transponding platforms through a second link, said first and second links defining a path for carrying transmissions including a unique coded signal wherein each said path is a two way communication network between one of said plurality of transponding platforms, said ground station and said target, said communication network includes ranging determination for said target with respect to at least two of said paths including a transmission with said unique coded signal portion;
c) determining a correction factor as a function of said two-way ranging navigation measurement and said global positioning system measurement; and
d) obtaining a corrected global positioning system measurement by taking a second global positioning system measurement of said target at a second predetermined time and adjusting said second global positioning system measurement by said correction factor.

13. The method of claim 12, wherein once a corrected global positioning system measurement is obtained, subsequent two way ranging navigation measurements of the target at subsequent predetermined periods of time to calculate and apply GPS correction factors are repeated at intermittent time intervals.

14. The method of claim 13, wherein the intermittent time interval is reduced for greater positioning accuracy and increased for lesser positioning accuracy.

* * * * *